(12) United States Patent
Pilpel et al.

(10) Patent No.: US 8,657,581 B2
(45) Date of Patent: Feb. 25, 2014

(54) THERMOPLASTIC ROTOR BLADE

(75) Inventors: Edward Pilpel, Avon, CT (US);
Benjamin Pilpel, Montrose, CO (US)

(73) Assignee: Gordon Holdings, Inc., Montrose, CO (US)

( * ) Notice: Subject to any disclaimer, the term of this patent is extended or adjusted under 35 U.S.C. 154(b) by 680 days.

(21) Appl. No.: 12/871,053

(22) Filed: Aug. 30, 2010

(65) Prior Publication Data
US 2011/0142670 A1  Jun. 16, 2011

Related U.S. Application Data

(60) Provisional application No. 61/237,735, filed on Aug. 28, 2009.

(51) Int. Cl.
*F03D 1/06* (2006.01)
*F01D 5/14* (2006.01)

(52) U.S. Cl.
USPC ........ 416/226; 416/229 R; 416/230; 416/232; 416/233; 416/234; 416/240; 416/241 A; 416/500; 415/4.1; 415/4.3; 415/4.5

(58) Field of Classification Search
USPC ............. 416/226, 229 R, 230, 232, 233, 234, 416/238, 240, 241 R, 241 A, 500, DIG. 4; 415/4.1, 4.3, 4.5, 200
See application file for complete search history.

(56) References Cited

U.S. PATENT DOCUMENTS

| | | | |
|---|---|---|---|
| 3,476,625 A | 11/1969 | Slivinsky et al. |
| 3,594,097 A | 7/1971 | Mouille et al. |
| 3,782,856 A | 1/1974 | Salkind et al. |
| 4,047,833 A | 9/1977 | Decker |
| 4,083,652 A | 4/1978 | Isaacson |
| 4,086,023 A | 4/1978 | Morgan |
| 4,150,920 A | 4/1979 | Belko et al. |
| 4,273,511 A | 6/1981 | Mouille et al. |
| 4,281,966 A | 8/1981 | Duret et al. |
| 4,295,790 A | 10/1981 | Eggert, Jr. |
| 4,302,155 A | 11/1981 | Grimes et al. |
| 4,306,837 A | 12/1981 | Brogdon et al. |
| 4,316,701 A | 2/1982 | Scarpati et al. |
| 4,332,525 A | 6/1982 | Cheney, Jr. |
| 4,403,918 A | 9/1983 | Schramm |
| 4,420,354 A | 12/1983 | Gougeon et al. |

(Continued)

OTHER PUBLICATIONS

International Search Report for PCT Application No. PCT/US2010/047099 dated Oct. 15, 2010.

*Primary Examiner* — Igor Kershteyn
(74) *Attorney, Agent, or Firm* — MKG, LLC

(57) ABSTRACT

A blade comprises a lightweight core, a composite material disposed on the core, and a skin located on the composite material. The composite material comprises fibers incorporated into a thermoplastic resin matrix in the form of a prepreg sheet or wet layup. The rotor blade may also comprise a front edge member attached along at least a portion of a leading edge of the core, a rear edge member attached along at least a portion of a trailing edge of the core, and a skin located over the core, the front edge member, and the rear edge member. The rotor blade may also comprise a spar extending through the core along a longitudinal axis of the rotor blade, and a skin located over the core and the spar. The edge members and the spars may be fabricated from thermoplastic material.

25 Claims, 14 Drawing Sheets

(56) References Cited

U.S. PATENT DOCUMENTS

| | | | |
|---|---|---|---|
| 4,566,853 A | 1/1986 | Likitanupak | |
| 4,611,971 A | 9/1986 | Aubry et al. | |
| 4,639,284 A | 1/1987 | Mouille et al. | |
| 4,650,401 A | 3/1987 | Yao et al. | |
| 4,714,409 A | 12/1987 | Denison et al. | |
| 4,874,292 A | 10/1989 | Matuska et al. | |
| 4,892,462 A | 1/1990 | Barbier et al. | |
| 4,961,687 A | 10/1990 | Bost et al. | |
| 4,976,587 A * | 12/1990 | Johnston et al. | 416/230 |
| 5,042,967 A | 8/1991 | Desjardins | |
| 5,047,106 A | 9/1991 | Matsumoto et al. | |
| 5,110,260 A | 5/1992 | Byrnes et al. | |
| 5,224,669 A | 7/1993 | Guimbal | |
| 5,284,420 A | 2/1994 | Guimbal | |
| 5,304,339 A | 4/1994 | Le Comte | |
| 5,454,693 A | 10/1995 | Aubry et al. | |
| 5,462,409 A | 10/1995 | Frengley et al. | |
| 5,486,096 A | 1/1996 | Hertel et al. | |
| 5,810,562 A | 9/1998 | Byrnes et al. | |
| 5,908,528 A | 6/1999 | Walla et al. | |
| 6,056,838 A * | 5/2000 | Besse et al. | 156/75 |
| 6,708,921 B2 | 3/2004 | Sims et al. | |
| 6,715,992 B2 | 4/2004 | Rinke | |
| 6,723,272 B2 | 4/2004 | Montague et al. | |
| 7,198,471 B2 * | 4/2007 | Gunneskov et al. | 416/229 R |
| 7,419,356 B2 | 9/2008 | Stiesdal | |
| 7,503,752 B2 * | 3/2009 | Gunneskov et al. | 416/229 R |
| 7,557,154 B2 | 7/2009 | Agarwal et al. | |
| 7,802,968 B2 * | 9/2010 | Jacobsen | 416/228 |
| 8,043,067 B2 * | 10/2011 | Kuroiwa et al. | 416/230 |
| 8,142,164 B2 * | 3/2012 | Rao et al. | 416/226 |
| 2005/0084373 A1 | 4/2005 | Suzuki | |
| 2006/0275132 A1 | 12/2006 | McMillan | |
| 2007/0253819 A1 | 11/2007 | Doorenspleet et al. | |
| 2008/0009403 A1 | 1/2008 | Hofmann et al. | |
| 2008/0202060 A1 | 8/2008 | Pilpel et al. | |
| 2008/0273981 A1 | 11/2008 | Ito et al. | |
| 2009/0008497 A1 | 1/2009 | Corsiglia et al. | |

* cited by examiner ns of the present invention.

THERMOPLASTIC ROTOR BLADE

CROSS REFERENCE TO RELATED APPLICATION

This application claims the benefit of U.S. Provisional Patent Application Ser. No. 61/237,735, filed Aug. 28, 2009, the contents of which are incorporated herein by reference in their entirety.

TECHNICAL FIELD

The present invention relates generally to rotor blades and, more particularly, to rotor blades incorporating thermoplastic materials.

BACKGROUND

Laminates of composite materials are often used in the construction of rotor blades for helicopters, fixed wing aircraft, and wind turbines. In a laminate, mutually bondable composite layers are stacked on top of one another, and the stacked layers are cured such that adjacent layers are bonded together.

Most rotor blades employ composite laminate skins or a shell over an internal structure such as a blade spar that extends along a length of the rotor blade toward a tip thereof. The skin or shell of the rotor blade is generally built around the internal structure of the blade by stacking layers of fiber fabrics in a half mold. Historically, these layers of fabrics have been pre-impregnated with a curable thermoset resin. The internal structure of the blade (including the spar) is placed on the stacked fabrics. A suitable filling mass such as foam or balsa may also be placed on the stacked fabrics around the internal structure. More layers of fabrics are folded onto the internal structure (and the filling mass, if any) and a second half mold is placed on the first half mold. The curable resin is then polymerized by the addition of heat and pressure to the mold, thereby forming the rotor blade.

SUMMARY

In one aspect, the present invention resides in a blade comprising a lightweight core, a composite material disposed on the core, and a skin (e.g., a sheet or layup of composite material of any desired thickness) located on the composite material. The composite material comprises fibers incorporated into a thermoplastic resin matrix in the form of a prepreg sheet or wet layup.

In another aspect, the present invention resides in a rotor blade for a wind turbine. The rotor blade comprises a lightweight core, a front edge member attached along at least a portion of a leading edge of the core, a rear edge member attached along at least a portion of a trailing edge of the core, and a skin located over the core, the front edge member, and the rear edge member. At least one of the front edge member and the rear edge member comprises a thermoplastic material. The thermoplastic material may include fibers to strengthen the edge members.

In another aspect, the present invention resides in a rotor blade for a wind turbine. This rotor blade comprises a lightweight core, a spar extending through the core along a longitudinal axis of the rotor blade, and a skin located over the core and the spar. The spar, which may comprise any one of a variety of configurations, is fabricated from a thermoplastic material. In a manner similar to other aspects, fibers or other reinforcing materials such as, but not limited to, glass or carbon particulate, may be added to the thermoplastic to strengthen the spar.

DETAILED DESCRIPTION

As used herein, the term "composite material" refers to a material containing high strength fibers in a thermoplastic resin matrix. The composite material may be in the form of a prepreg sheet or a wet layup. The prepreg sheet or wet layup may also be in the form of a tape. The fibers can be of any suitable length or configuration (e.g., long, short, chopped, or continuous). The present invention is not limited to fibers, however, as particulates are within the scope of the present invention.

Figure 1:
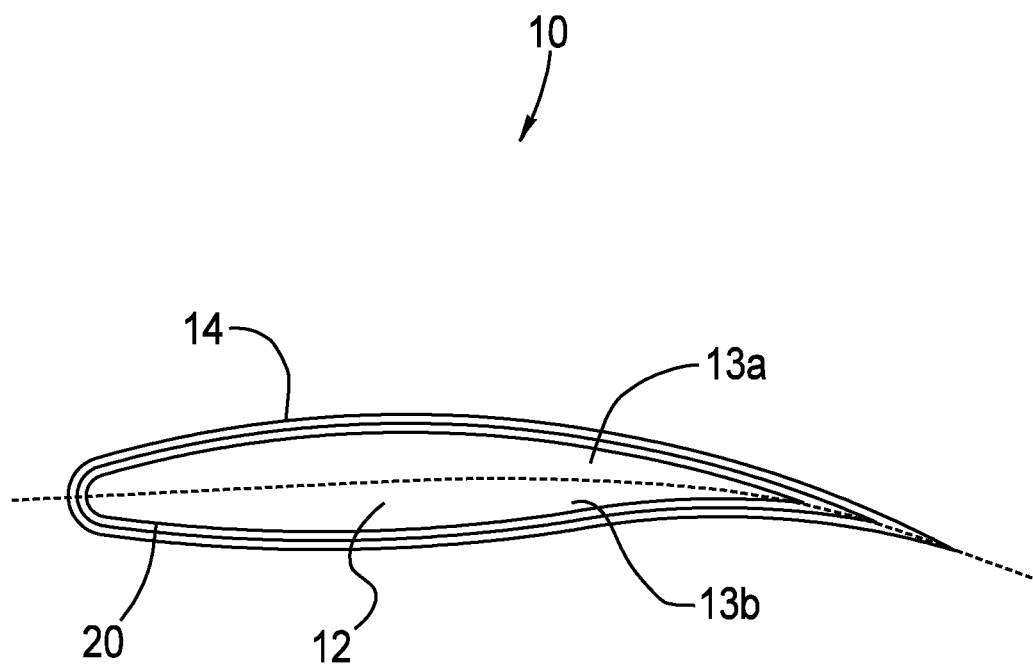
FIG. 1 is a side sectional view of a rotor blade, of the present invention.
Figure 2:
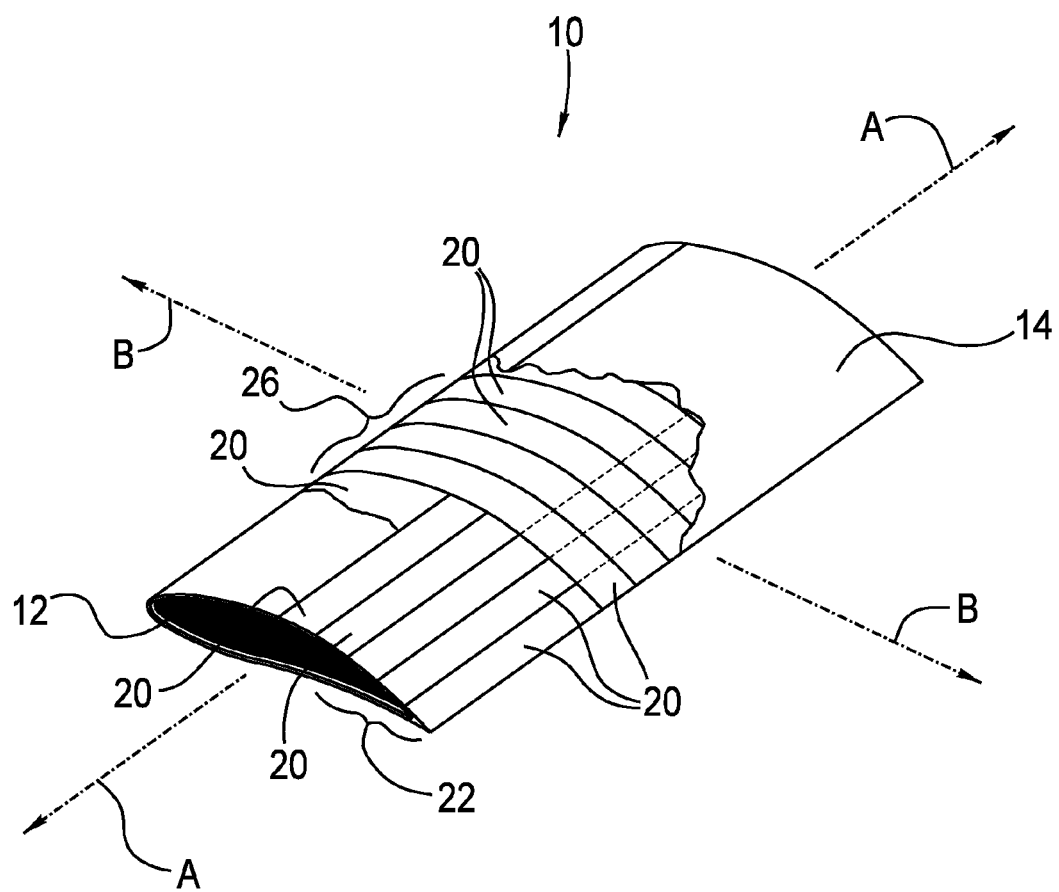
FIG. 2 is a perspective cutaway view of the rotor blade of FIG. 1.

As shown in FIGS. 1 and 2, a rotor blade is designated generally by the reference number 10 and is hereinafter referred to as "blade 10." Blade 10 is applicable to wind turbines. The present invention is not so limited, however, as the blade can be used in conjunction with any type of device including, but not limited to, fan blades, helicopter rotor blades, aircraft propellers, wings, boat propellers, and the like.

The blade 10 is constructed with a core 12 fabricated of foam, wood, or any other suitable lightweight material over which a skin 14 is disposed. The core may be solid with any suitable degree of porosity, or it may be composed of discrete cells that may or may not be connected (e.g., a honeycomb or similar configuration). The illustrated core 12 comprises an upper half 13a and a lower half 13b that can be formed by molding using materials such as, but not limited to, polyethylene terephthalate (PET). The core 12 can also be composed of composite materials as well as compositions of different materials such as, for example, wood and composite flakes molded or otherwise combined into a desired core shape.

In covering the core 12 with a thermoplastic composite material and the skin 14, the core is wrapped with a thermoplastic composite material in the form of a tape 20. The thermoplastic composite material comprises fibers having high strength and suitable stiffness in a thermoplastic resin matrix. The thermoplastic resin matrix may be any suitable thermoplastic including, but not limited to, PET, polyvinyl chlorides, polyvinylidene chlorides, polyvinyl acetates, polypropylenes, polyethylenes, polystyrenes, polyurethanes, polyphenylene sulfide, combinations of the foregoing materials, and the like. The fibers in the thermoplastic resin matrix may be any suitable fiber having desirable strength including, but not limited to, glass, high strength glass, carbon (e.g., carbon fiber), combinations of the foregoing, and the like. The fibers may be continuous, chopped, or in particulate form.

As is shown in FIG. 2, strips 22 of the tape 20 are placed laterally along the core 12 and parallel to a 0 degree axis or longitudinal axis A of the blade 10. The tape 20 is also wound circumferentially about the longitudinal axis A at about 90 degrees thereto to form wraps 26, which provide strength in directions substantially perpendicular to the longitudinal axis A, i.e. parallel to a 90 degree axis B. By configuring strips 22 along the blade 10 and winding the tape in such a manner to form the wraps 26, torsional stiffness is provided to the blade. In winding the tape 20 to form the wraps 26 (as well as placing the strips 22 laterally), the tape may be overlapped by any suitable amount.

Figure 3:
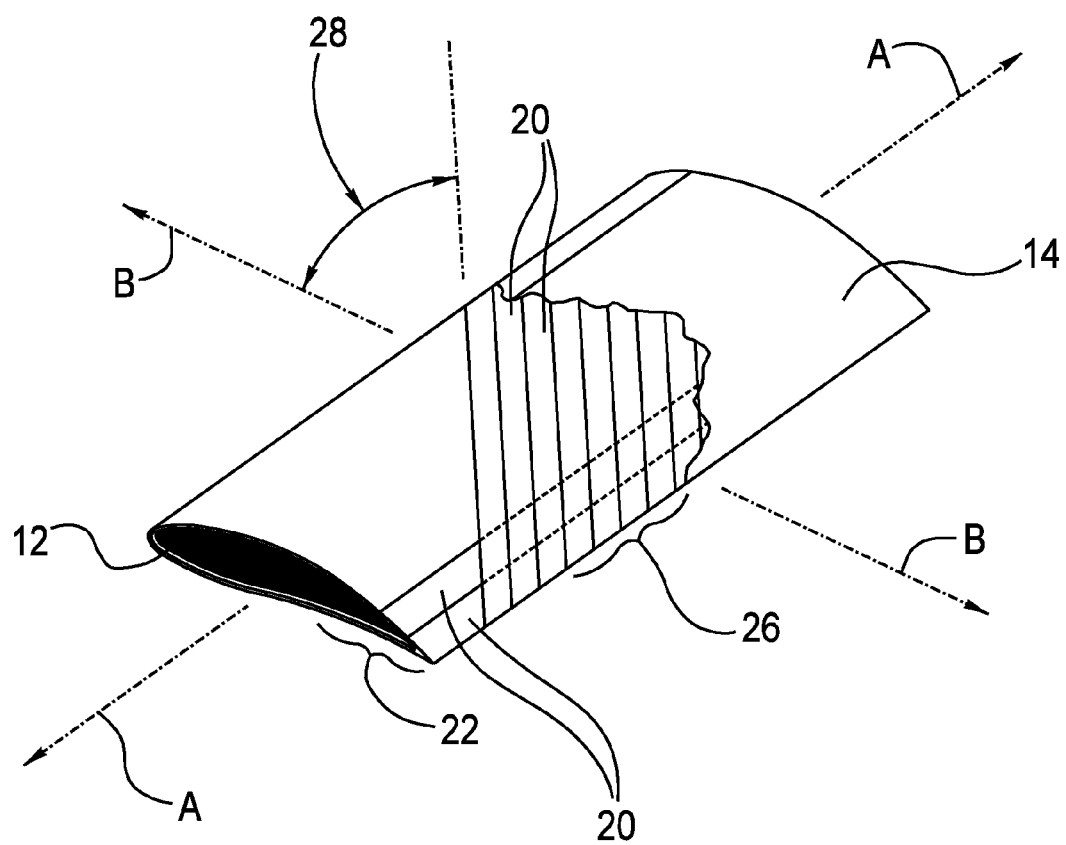
FIG. 3 is a perspective cutaway view of the rotor blade of FIG. 1 showing an alternate configuration of tape wrapping.
Figure 4:
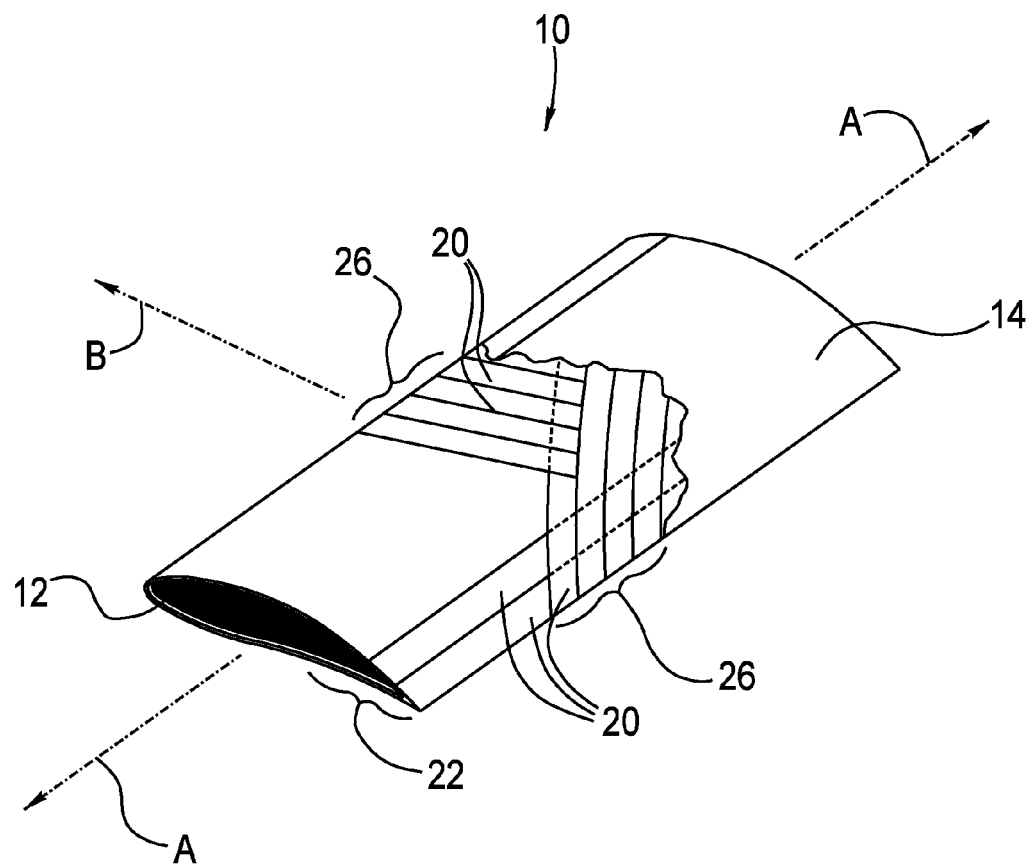
FIG. 4 is a perspective cutaway view of the rotor blade of FIG. 1 showing another alternate configuration of tape wrapping.
Figure 5:
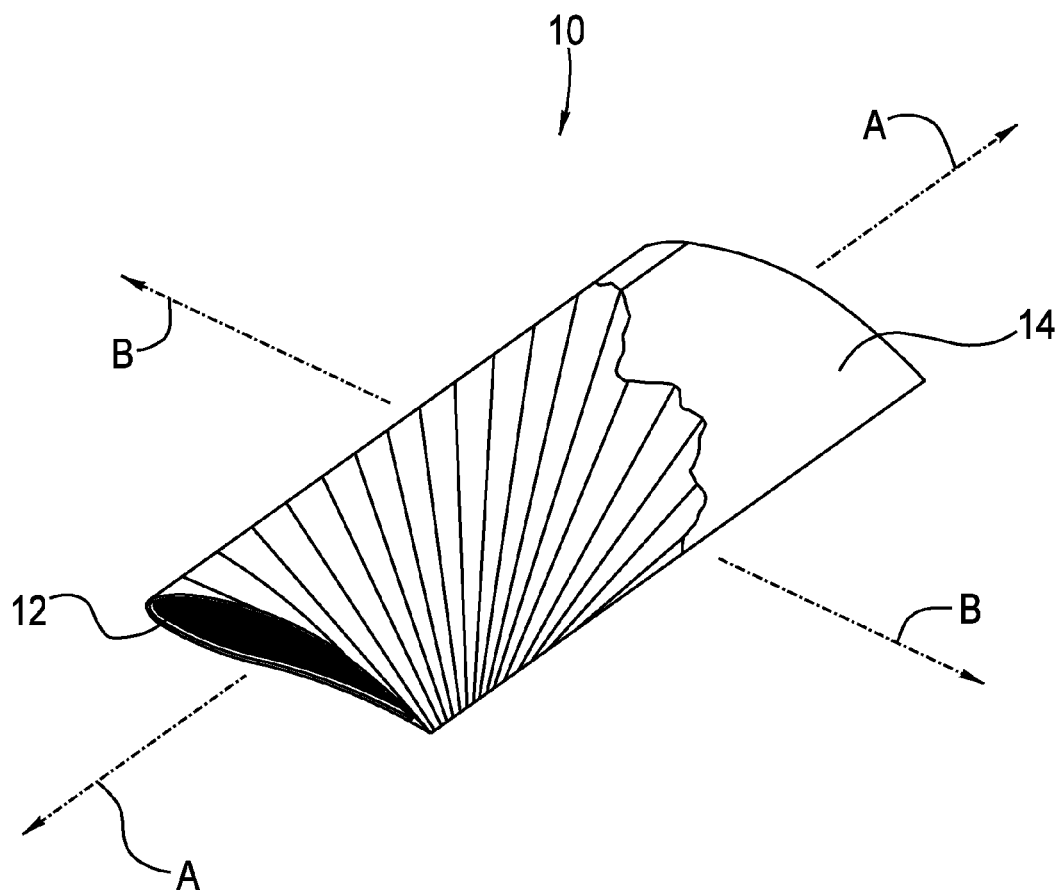
FIG. 5 is a perspective cutaway view of the rotor blade of FIG. 1 showing another alternate configuration of tape wrapping.

As is shown in FIG. 2, the wraps 26 can be at 90 degree angles to the longitudinal axis A, or, as shown in FIG. 3, they can be at any other suitable angle 28. Wrapping the tape at angles of less than 90 degrees, for example, at angles of about 85 degrees relative to the longitudinal axis A enhances the torsional and structural properties of the blade. As is shown in FIG. 4, the wraps 26 can be made in two directions and overlap each other, with alternating courses of wraps being oriented at angles of about 45 degrees relative to the 90 degree axis B in opposing directions (e.g., alternating courses of wraps being +/−45 degrees relative to the 90 degree axis B). An angle of 37.5 degrees is a commonly used angle to place composite tapes for longitudinal and torsional rigidity. As is shown in FIG. 5, the angles can be increasingly varied relative to the 90 degree axis B along the length of the blade 10.

In any of the foregoing embodiments, the skin 14 can be a sheet or layup of composite material of any desired thickness and disposed over the tape-wrapped core 12. The present invention is not limited to the skin being composite material, however, as other materials (e.g., metal) can be used as the skin without departing from the broader aspects of the invention. Irrespective of the material of the skin 14, by increasing the thickness thereof, the stiffness of the blade 10 can be varied to provide any desired stiffness (or flexibility). Generally, the desired stiffness provides for a sufficient strength of the blade 10. A final covering of plastic film may be added for UV protection and/or as a moisture barrier.

Figure 6:
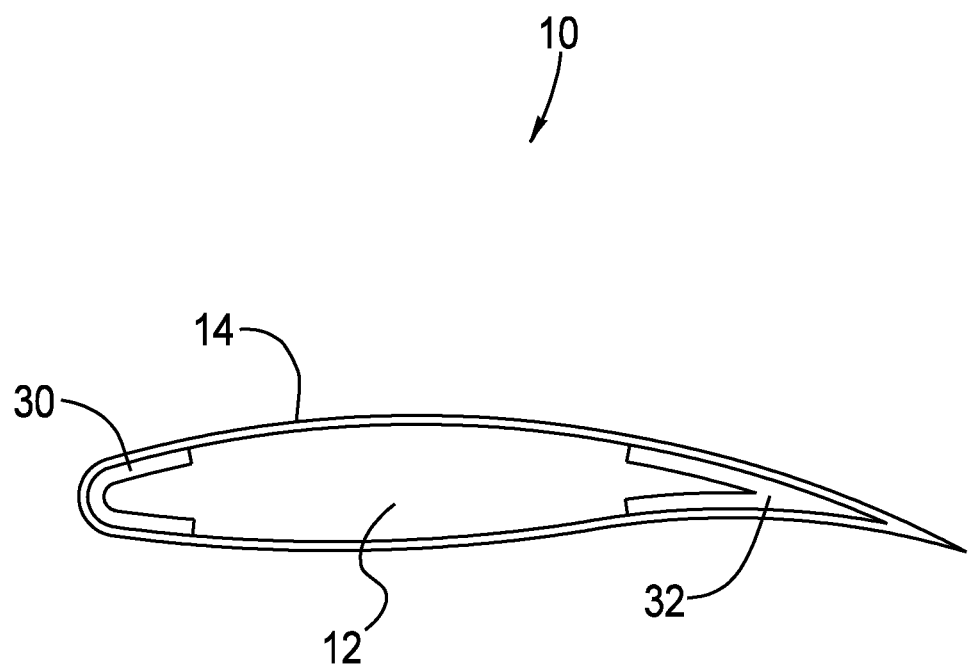
FIG. 6 is a side sectional view of a rotor blade, of the present invention, showing reinforcing members at the leading and trailing edges of the rotor blade.
Figure 7:
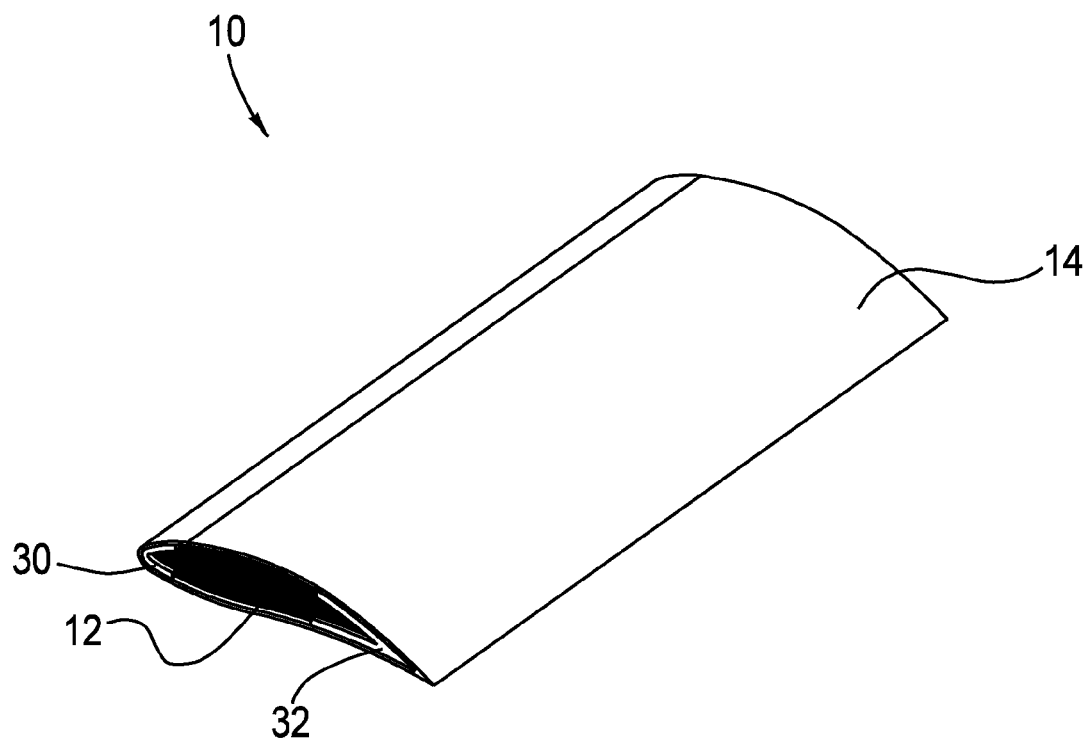
FIG. 7 is a perspective cutaway view of the rotor blade of FIG. 6.

As is shown in FIGS. 6 and 7, the blade 10 includes a front edge member 30 attached to at least a portion of a front of the core 12. The skin 14 is disposed over both the core and the front edge member 30. The front edge member 30 comprises an elongated member that, when attached to the material of the core 12 and covered with the skin 14, provides a desirable rounded leading edge surface. The blade 10 also (or alternatively) includes a rear edge member 32 attached to at least a portion of a rear of the core 12. The rear edge member 32 comprises an elongated member that, when attached to the material of the core 12 and covered with the skin 14, provides a desirable trailing edge surface. Both the front edge member 30 and the rear edge member 32 may be fabricated of thermoplastic and formed by pultrusion. The thermoplastic may incorporate fibers having desirable stiffness, such as glass, high strength glass, carbon (e.g., carbon fiber), combinations of the foregoing, and the like. Incorporation of one or more of the front edge member 30 and the rear edge member 32 onto the blade 10 increases the stiffness of the blade 10.

Figure 8:
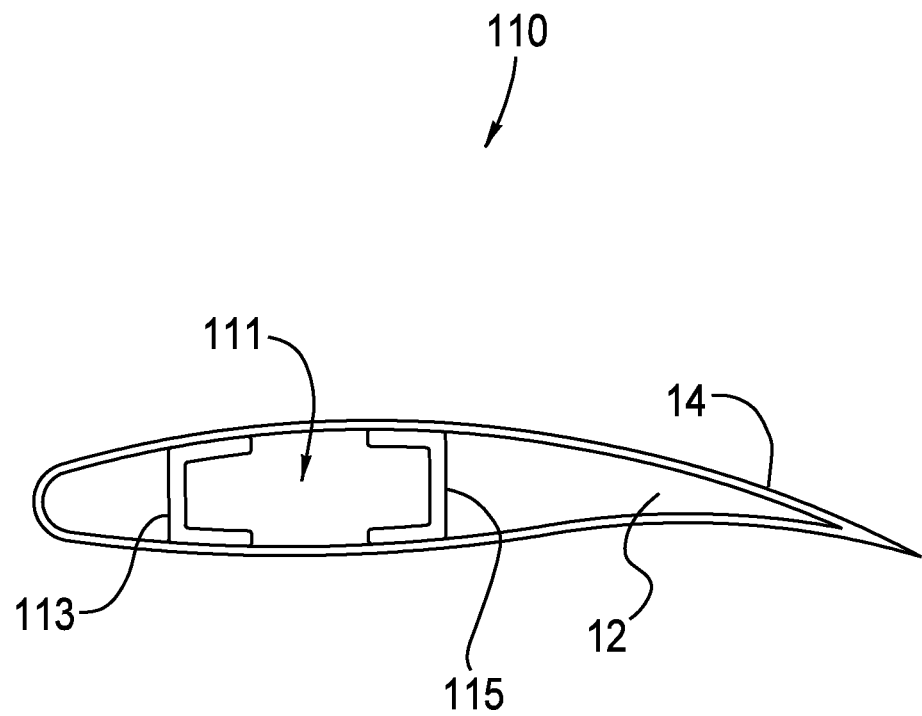
FIG. 8 is a side sectional view of a rotor blade, of the present invention, including a spar.
Figure 9:
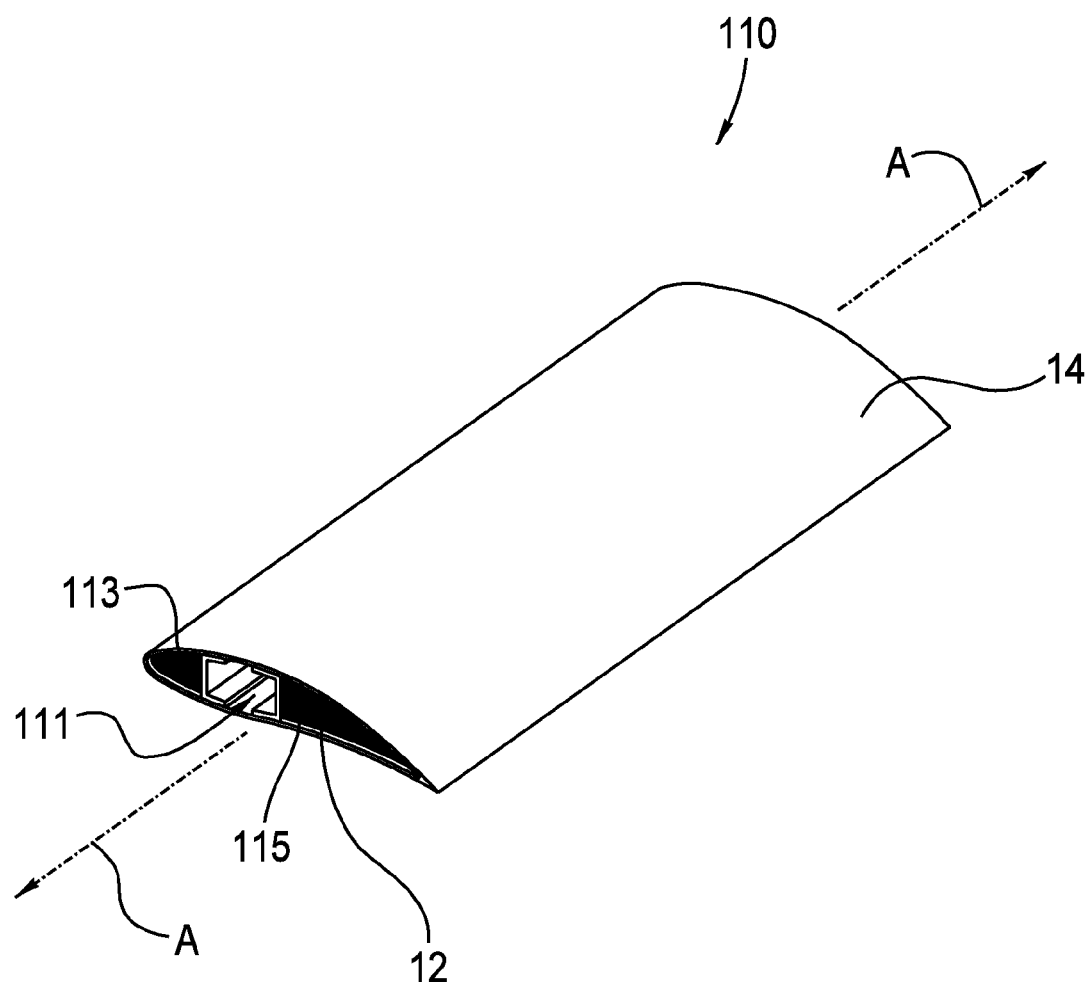
FIG. 9 is a perspective view of the rotor blade of FIG. 8.
Figure 10:
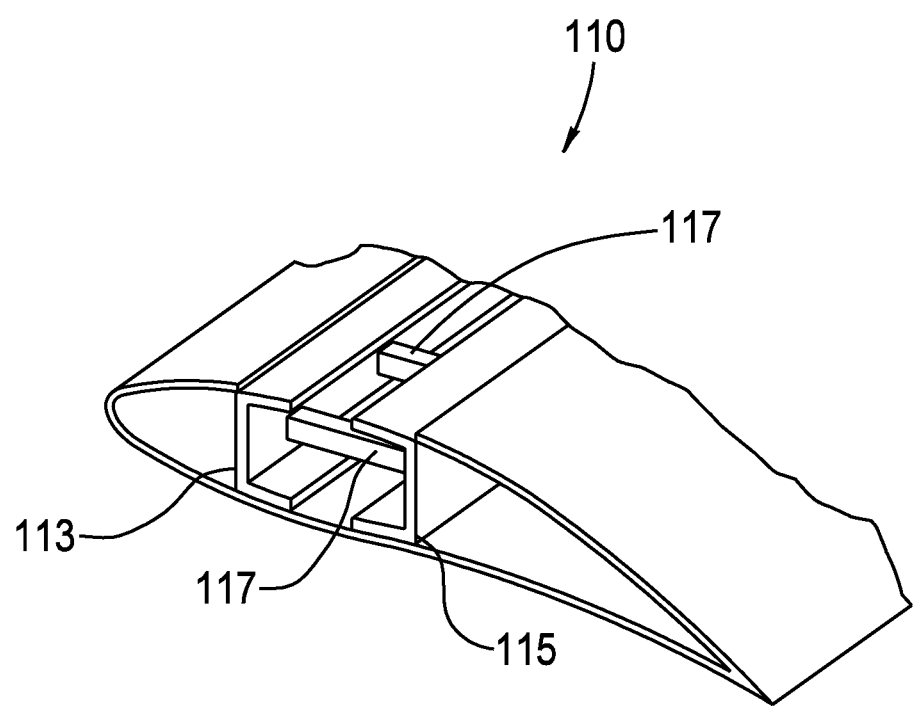
FIG. 10 is a perspective cutaway view of the rotor blade of FIG. 8 showing the spar.

As is shown in FIGS. 8 and 9, another embodiment of the blade is designated generally by the reference number 110. Blade 110 comprises a spar 111 located internal to the blade and through the core 12 to provide stiffness. The spar 111 comprises two beams having C-shaped cross sections, namely, a forward beam 113 and a rearward beam 115 positioned along the longitudinal axis A and arranged such that the open portions defined by the C-shapes face each other. Referring now to FIG. 10, the forward beam 113 and the rearward beam 115 may be connected to each other along the lengths thereof using ribs 117 to provide stability to the blade 110.

In any of FIGS. 8-10, the material of the core 12 is located forward of the forward beam 113, rearward of the rearward beam 115, and between the forward beam 113 and the rearward beam 115, thereby filling the blade 110. The material filling the core 12 is not shown in FIG. 10. The core 12 and the spar 111 are covered by the skin 14. Both the forward beam 113 and the rearward beam 115 (as well as the ribs 117) may be fabricated of a thermoplastic and formed by pultrusion, extrusion, casting, molding, or any other suitable method. The thermoplastic may incorporate high strength fibers, glass, high strength glass, carbon (e.g., carbon fiber), basalt, high strength thermoplastic fibers, combinations of the foregoing, and the like. As with other embodiments of the blade, incorporation of the spar 111 into the blade 110 increases the stiffness of the blade. However, the present invention is not limited in this regard, as the core can be formed from any other suitable material.

Figure 11:
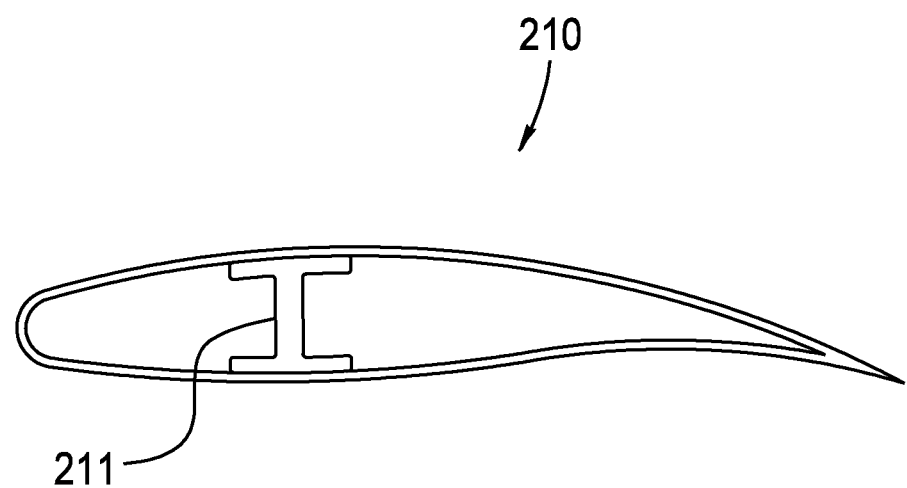
FIG. 11 is a side sectional view of a rotor blade, of the present invention, including an alternate embodiment of a spar.
Figure 12:
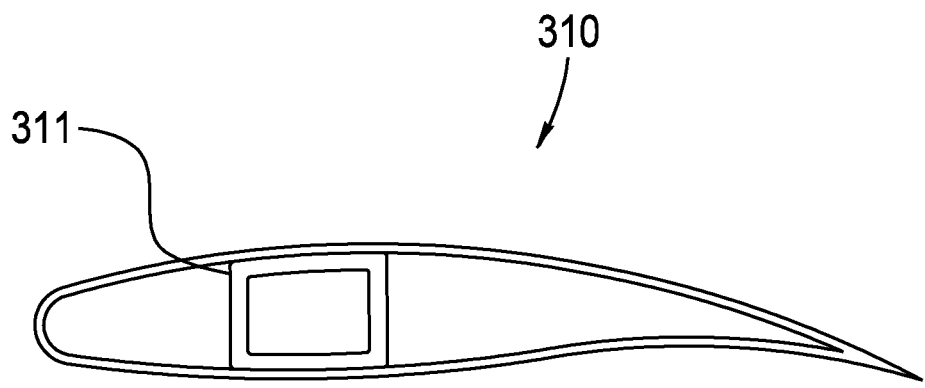
FIG. 12 is a side sectional view of a rotor blade, of the present invention, including another alternate embodiment of a spar.

The spar 111 is not limited to comprising two beams having C-shaped cross sections. As is shown in FIG. 11, a blade 210 contains a spar 211 comprising a beam having an I-shaped cross section. As is shown in FIG. 12, a blade 310 may contain a spar 311 comprising a beam having a box-shaped cross section. The box-shaped cross section of the spar 311 may be filled with suitable core material. As with other spars, the spar 211 or the spar 311 may be fabricated of a thermoplastic and formed by pultrusion, extrusion, casting, molding, or any other suitable method. The thermoplastic may incorporate high strength fibers, glass, high strength glass, carbon (e.g., carbon fiber), combinations of the foregoing, and the like.

Figure 13:
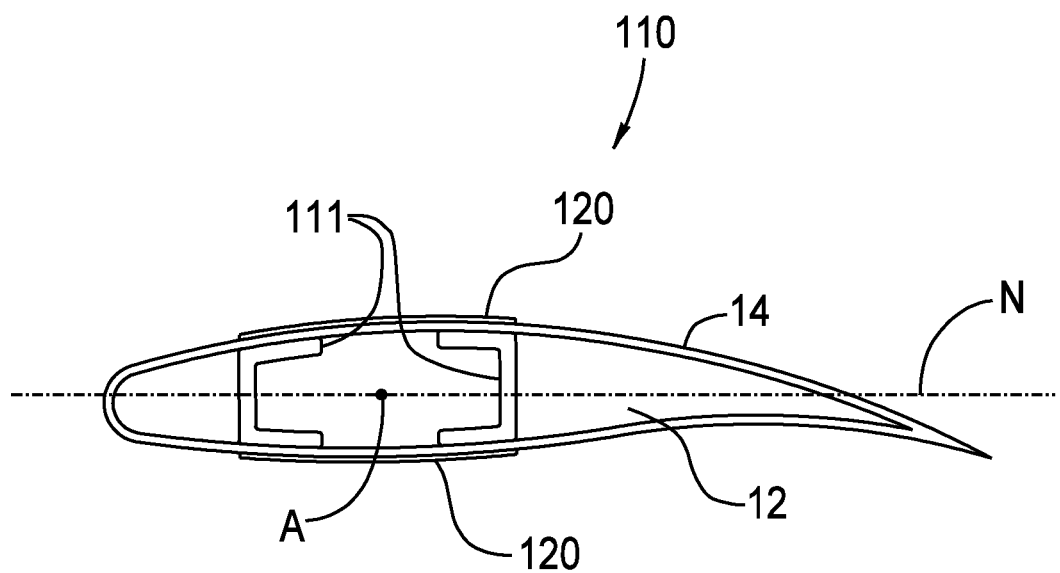
FIG. 13 is a side sectional view of a rotor blade, of the present invention, including a spar and supporting layers.
Figure 14:
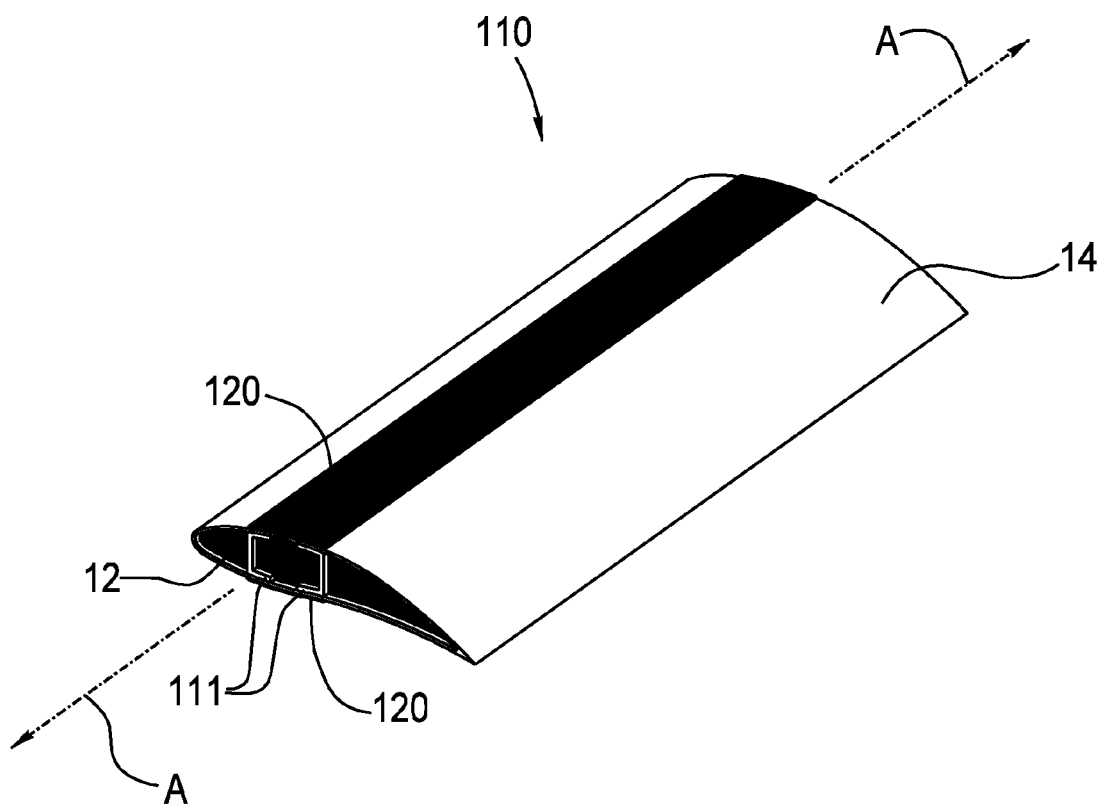
FIG. 14 is a perspective view of the rotor blade of FIG. 13.

As is shown in FIGS. 13 and 14, support layers 120 are located on opposing sides of the blade 110. By locating the support layers 120 on the skin 14 of the blade, distanced from and parallel to the longitudinal axis A (and perpendicular to a neutral axis N), the stiffness of the blade 110 is governed according to the parallel axis theorem as denoted by the equation $$I_{AA'} = I_{BB'} + Ad^2$$

in which $I_{AA'}$ is the area moment of inertia relative to a first axis along a length of the blade 110 and planar with a first one of the support layers 120, $I_{BB'}$ is the area moment of inertia relative to the centroid of the other support layer 120, A is the area of the first support layer, and d is distance from the first support layer to the second support layer.

The support layers 120 comprise panels or sheets. Preferably, a profile of each panel or sheet defining the support layers 120 is minimal so as to have a minimal effect on airflow past the blade 110 during use thereof. The panels or sheets are fabricated of a thermoplastic and may incorporate high strength fibers, glass, high strength glass, carbon (e.g., carbon fiber), combinations of the foregoing, and the like.

In embodiments of the blade in which a spar is incorporated, the support layers 120 are located proximate the spar. In particular, the support layers 120 are located directly over and under the spar 111 and are attached to the skin 14 of the blade 110 using any suitable means, such as adhesives, welding, mechanical fasteners, or the like. In embodiments using mechanical fasteners to attach the support layers 120 to the blade 110, the mechanical fasteners (e.g., rivets, pins, bolts, and the like) are inserted through the support layers, through the skin 14 and into the spar 111. The spar is not limited to that defined by members having C-shaped cross sections (spar 111), however, as any other configuration of the spar may be used in a blade incorporating support layers 120.

The use of the thermoplastic resin matrix provides increased impact resistance and improved bonding of fibers incorporated therein, as compared to other resins, and significantly improves the durability of a rotor blade. The thermoplastic composite material used also affects the aerodynamic design of the blade by compensating for variation in performance properties of the blade, e.g., by increasing the thickness of the blade, as compared to other blades, thereby providing for increased stiffness. Such increased stiffness contributes to minimization of the deflection of the blade so to have less of an impact on supporting structure (such as support towers, guy lines, and the like). Such increased stiffness also counters any reduction in aerodynamic efficiency of the blade.

Although this invention has been shown and described with respect to the detailed embodiments thereof, it will be understood by those of skill in the art that various changes may be made and equivalents may be substituted for elements and steps thereof without departing from the scope of the invention. In addition, modifications may be made to adapt a particular situation to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A blade, comprising:
  a core;
  a composite material disposed on the core; and
  a skin located on the composite material;
  wherein the composite material comprises fibers incorporated into a thermoplastic resin matrix, and the thermoplastic resin matrix is a material selected from the group consisting of polyethylene terephthalate, polyvinyl chlorides, polyvinylidene chlorides, polyvinyl acetates, polypropylenes, polyethylenes, polystyrenes, polyurethanes, polyphenylene sulfide, and combinations of the foregoing materials.

2. The blade of claim 1, wherein the fibers are selected from the group consisting of glass, high strength glass, carbon, basalt, high strength thermoplastic fibers, and combinations of the foregoing materials.

3. The blade of claim 1, wherein the core is formed from molded polyethylene terephthalate.

4. The blade of claim 1, wherein the core comprises a material selected from the group consisting of foam, wood, and combinations of the foregoing materials.

5. The blade of claim 4, wherein the core is a porous solid.

6. The blade of claim 4, wherein the core comprises a plurality of discrete cells.

7. The blade of claim 1, wherein the composite material is in the form of a tape.

8. The blade of claim 7, wherein the tape comprises strips, the strips being placed longitudinally along the rotor blade and substantially parallel to a longitudinal axis extending through the rotor blade.

9. The blade of claim 7, wherein the tape is wrapped circumferentially about a longitudinal axis extending through the rotor blade.

10. The blade of claim 9, wherein the tape is wrapped substantially perpendicularly to the longitudinal axis.

11. The blade of claim 9, wherein the tape is wrapped at an angle of between about 45 degrees and about 90 degrees relative to the longitudinal axis.

12. The blade of claim 11, wherein the tape is wrapped in courses at opposing angles of about 45 degrees relative to the longitudinal axis.

13. The blade of claim 1, further comprising a front edge member attached to at least a portion of a front of the core, wherein the front edge member comprises a thermoplastic composite material.

14. The blade of claim 1, further comprising a rear edge member attached to at least a rear portion of the core, wherein the rear edge member comprises a thermoplastic composite.

15. The blade of claim 1, further comprising a spar located within the core and extending along a longitudinal axis through the rotor blade.

16. The blade of claim 15, further comprising support layers located on the skin and parallel to the longitudinal axis.

17. A rotor blade for a wind turbine, the rotor blade comprising,
  a core;
  a front edge member attached to the core along at least a portion of a leading edge defined by the core;
  a rear edge member attached to the core along at least a portion of a trailing edge defined by the core; and
  a skin located over the core, the front edge member, and the rear edge member;
  wherein at least one of the front edge member and the rear edge member comprises a thermoplastic composite material.

18. The rotor blade of claim 17, wherein the thermoplastic composite material includes fibers selected from the group consisting of glass, high strength glass, carbon, and combinations of the foregoing materials.

19. The rotor blade of claim 17, further comprising a thermoplastic composite material located on the core, the thermoplastic composite being in the form of a prepreg sheet or wet layup.

20. The rotor blade of claim 17, wherein the material of the core is molded polyethylene terephthalate.

21. A rotor blade for a wind turbine, the rotor blade comprising,
  a core;
  a spar extending through the core along a longitudinal axis of the rotor blade;
  a skin located over the core and the spar; and
  a first support layer located on the skin and extending along at least a portion of the length of the rotor blade;
  wherein the spar comprises a thermoplastic composite material.

22. A rotor blade for a wind turbine, the rotor blade comprising,
  a core;

a spar extending through the core along a longitudinal axis of the rotor blade; and a skin located over the core and the spar;

wherein the spar comprises a thermoplastic composite material and a beam having an I-shaped cross section.

23. A rotor blade for a wind turbine, the rotor blade comprising, a core;

a spar extending through the core along a longitudinal axis of the rotor blade; and a skin located over the core and the spar;

wherein the spar comprises a thermoplastic composite material and a beam having a box-shaped cross section.

24. The rotor blade of claim 21, further comprising a second support layer located on the skin and extending along at least a portion of the length of the rotor blade, the first support layer and the second support layer being positioned substantially opposite one another on the spar.

25. The rotor blade of claim 21, wherein the thermoplastic material includes fibers selected from the group consisting of glass, high strength glass, carbon, and combinations of the foregoing materials.

* * * * *